(12) United States Patent
Dumitru et al.

(10) Patent No.: US 7,590,935 B2
(45) Date of Patent: Sep. 15, 2009

(54) DYNAMIC GENERATION OF WSDL DOCUMENTS BASED ON DATABASE METADATA

(75) Inventors: Donald W. Dumitru, Bellevue, WA (US); Joel M. Soderberg, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 11/177,077

(22) Filed: Jul. 8, 2005

(65) Prior Publication Data

US 2007/0011605 A1 Jan. 11, 2007

(51) Int. Cl.
G06F 17/24 (2006.01)
(52) U.S. Cl. .................. 715/234; 715/200; 715/239
(58) Field of Classification Search .............. 715/200, 715/234, 239
See application file for complete search history.

(56) References Cited

U.S. PATENT DOCUMENTS

| 7,117,504 | B2* | 10/2006 | Smith et al. ............... 719/328 |
| 2004/0207659 | A1* | 10/2004 | Goodman et al. .......... 345/762 |
| 2004/0266439 | A1* | 12/2004 | Lynch et al. ............... 455/444 |
| 2005/0149935 | A1* | 7/2005 | Benedetti .................. 718/102 |
| 2005/0198100 | A1* | 9/2005 | Goring et al. .............. 709/200 |
| 2005/0204051 | A1* | 9/2005 | Box et al. .................. 709/230 |
| 2005/0256882 | A1* | 11/2005 | Able et al. ................. 707/10 |
| 2006/0026552 | A1* | 2/2006 | Mazzitelli et al. .......... 717/101 |
| 2006/0136489 | A1* | 6/2006 | Thome et al. ............. 707/103 R |

* cited by examiner

Primary Examiner—Joshua D Campbell
(74) Attorney, Agent, or Firm—Woodcock Washburn LLP

(57) ABSTRACT

Methods for generating WSDL ("Web Services Description Language") documents to describe types and function entry points based on database metadata are disclosed. Such a method may include resolving the endpoint metadata by querying based on parameters about the request collected by the HTTP stack. From the endpoint metadata, the list of entry points which have been mapped may be collected. For each entry point, attributes about the entry point may be collected, and metadata for the types of parameters to the entry point may be looked up. A first collection of unique XML schema namespaces may be created, with one entry corresponding to each unique XML schema namespace for any arbitrary user-defined XML Schema definitions required by a parameter to an entry point. A second collection of unique XML schema namespaces may be created, with one entry corresponding to each unique XML schema namespace for an entry point. The wrapper elements for the WSDL document and any global XML schema definitions may be emitted. The first collection of unique XML schema namespaces may be iterated through, and the XML schema definitions may be emitted. The second collection of unique XML schema namespaces may be iterated through. For each entry point in the second collection, the XML schema definition for the entry point may be emitted, including any XML schema definitions for parameters to the entry point. After emitting all of the XML schema definitions, the entry points may be iterated through, and WSDL document definitions for messages, port types, and bindings for each entry point may be emitted. After emitting all of the message definitions, the WSDL document may be completed by emitting service entry definitions for the endpoint.

14 Claims, 4 Drawing Sheets

Configuration Info
Entry Points Mapping
Global Service Options

Type Metadata
Name
Type Info

Entry Point Metadata
Name
Parameters

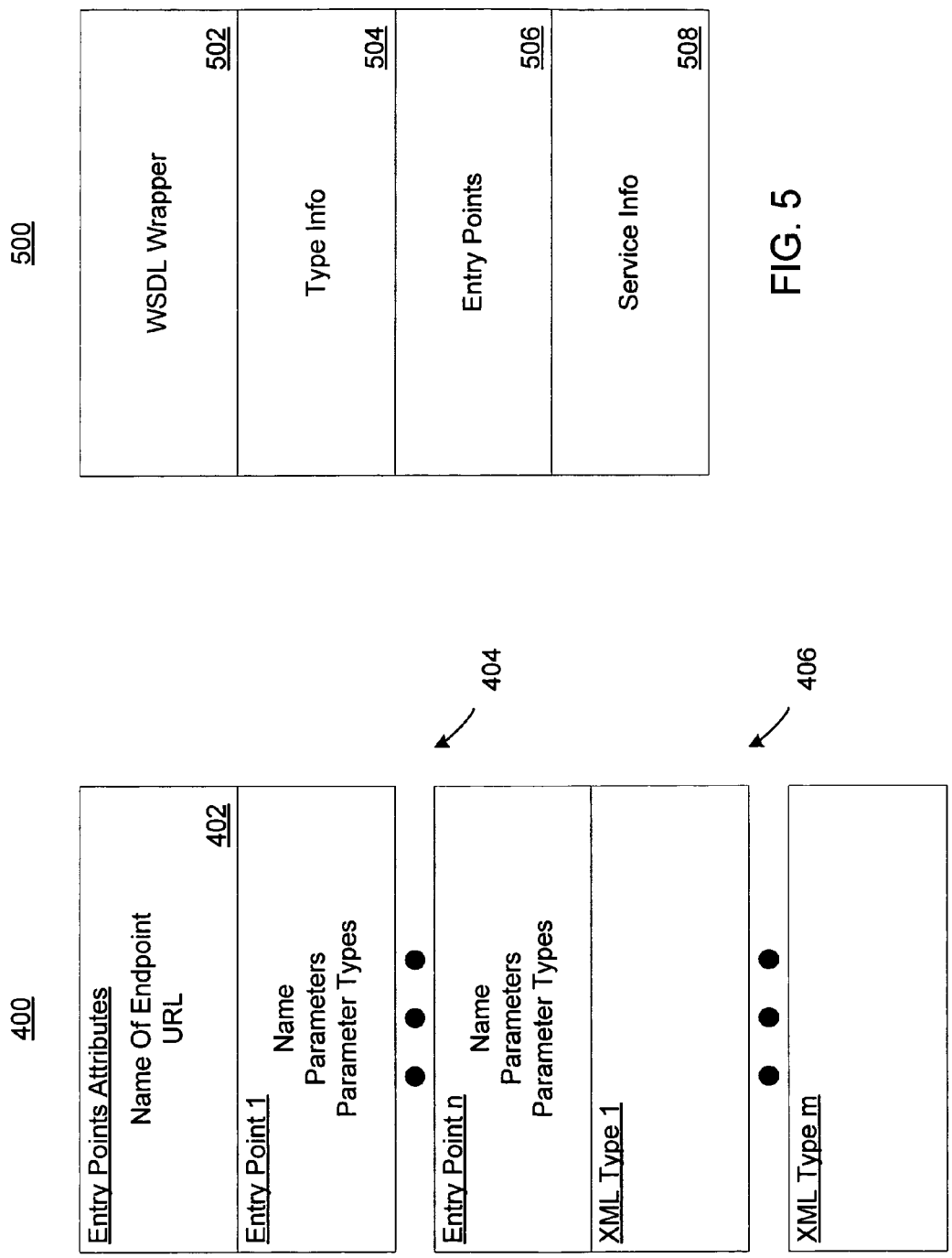

DYNAMIC GENERATION OF WSDL DOCUMENTS BASED ON DATABASE METADATA

FIELD OF THE INVENTION

Generally, the invention relates to dynamic generation of WSDL documents based on database metadata. More particularly, the invention relates to methods for generating, based on database metadata, a WSDL document that describes types and function entry points.

BACKGROUND OF THE INVENTION

For programs to access services and types that exist on server, the services and types must be described in a manner that enables a programmer to write programs to access the services and types. One way to provide such description is to provide printed documentation. Such printed documentation, however, requires human intervention to interpret the description.

Web Services Description Language (WSDL) is a standards-based document format that allows for machine descriptions of services and types. Such a description can be used directly in a programming environment. Thus, in a programming environment on a client, for example, a programmer can automatically build language bindings to access services on the server.

In WSDL documents, types can be described in terms of eXtensible Markup Language (XML) data types. The services and types that exist on the server, which may be a Structured Query Language (SQL) server, for example, can be mapped to XML. The types that exist on the client, which may be a programming environment, such as a C# programming environment, for example, can also be mapped into XML. Thus, the server and client can communicate with one another using their respective mappings to XML as translations to and from a common language.

Some server environments map from a programming language environment or "domain" (e.g., C#) into an XML domain. For example, methods for generating WSDL documents from C#, PERL, and other such programming languages are known. There is a need, however, for defining services provided in a database environment. Thus, there is a need for describing database services and types in a WSDL document.

SUMMARY OF THE INVENTION

The invention provides a mechanism for querying a database for metadata at runtime in order to satisfy the request for a WSDL document, as well as a specific algorithm for coalescing definitions into common XML Schema namespaces. In particular, the invention provides methods for generating WSDL documents to describe types and function entry points based on database metadata.

A method according to the invention may include resolving the endpoint metadata by querying based on parameters about the request collected by the HTTP stack. Those skilled in the art will recognize this as being similar to, or the same as, the mechanisms for supporting "virtual hosts" or "virtual roots" for HTTP servers. From the endpoint metadata, the list of entry points which have been mapped may be collected. For each entry point, attributes about the entry point may be collected, and metadata for the types of parameters to the entry point may be looked up.

A first collection of unique XML Schema namespaces may be created, with one entry corresponding to each unique XML Schema namespace for any arbitrary user-defined XML Schema definitions required by a parameter to an entry point. A second collection of unique XML Schema namespaces may be created, with one entry corresponding to each unique XML Schema namespace for an entry point. The wrapper elements for the WSDL document may be emitted. Any global XML Schema definitions may be emitted.

The first collection of unique XML Schema namespaces may be iterated through, and the XML Schema definitions may be emitted. The second collection of unique XML Schema namespaces may be iterated through. For each entry point in the second collection, the XML Schema definition for the entry point may be emitted, including any XML Schema definitions for parameters to the entry point.

After emitting all of the XML Schema definitions, the entry points may be iterated through, and WSDL document definitions for messages, port types, and bindings for each entry point may be emitted. After emitting all of the message definitions, the WSDL document may be completed by emitting service entry definitions for the endpoint.

BRIEF DESCRIPTION OF THE DRAWINGS

FIG. 2 is a block diagram representing example database metadata.

FIG. 4 is a block diagram representing an example workspace for collecting information from which to build a WSDL document.

FIG. 5 is a block diagram representing an example WSDL document generated using a method according to the invention.

DETAILED DESCRIPTION OF ILLUSTRATIVE EMBODIMENTS

Example Computing Environment

Figure 1:
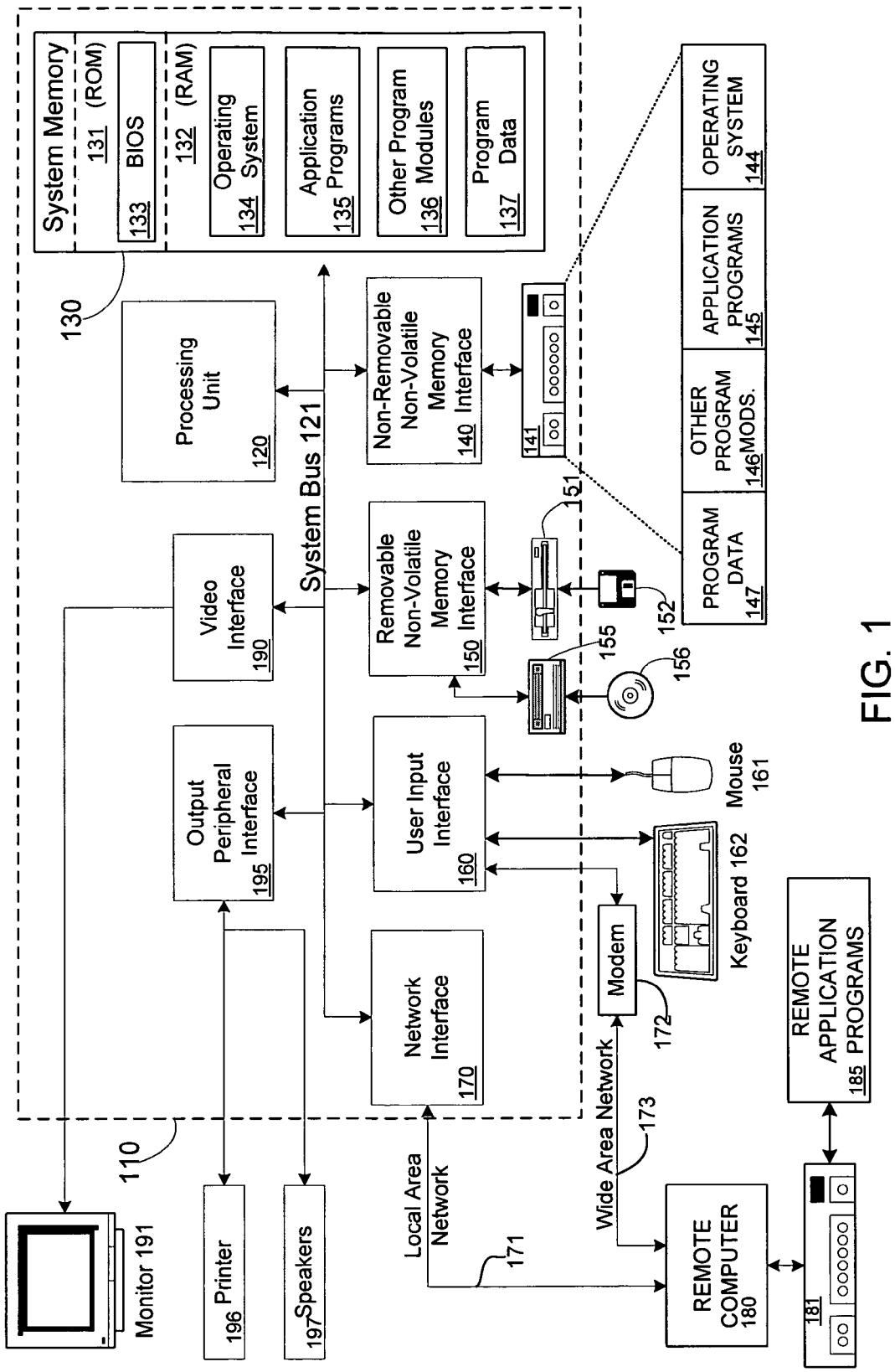
FIG. 1 is a block diagram showing an example computing environment in which aspects of the invention may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Dynamic Generation of WSDL Documents Based on Database Metadata

Basically, a WSDL document defines a web-based service. Such a document may provide information necessary for the service to be called and used. Such information may include, for example, the address of the service, names of methods (i.e., entry points) on the service, etc. A typical WSDL document may include type information, zero or more entry points, service information, etc. As shown in FIG. 2, database metadata 200 may include a set of configuration information that indicates what the user wants to expose. Such configuration information may include entry points mapping; global services options; etc. The database may also include type metadata, such as name and type information, as well as entry point metadata, which may include name and parameter information.

Figure 3:
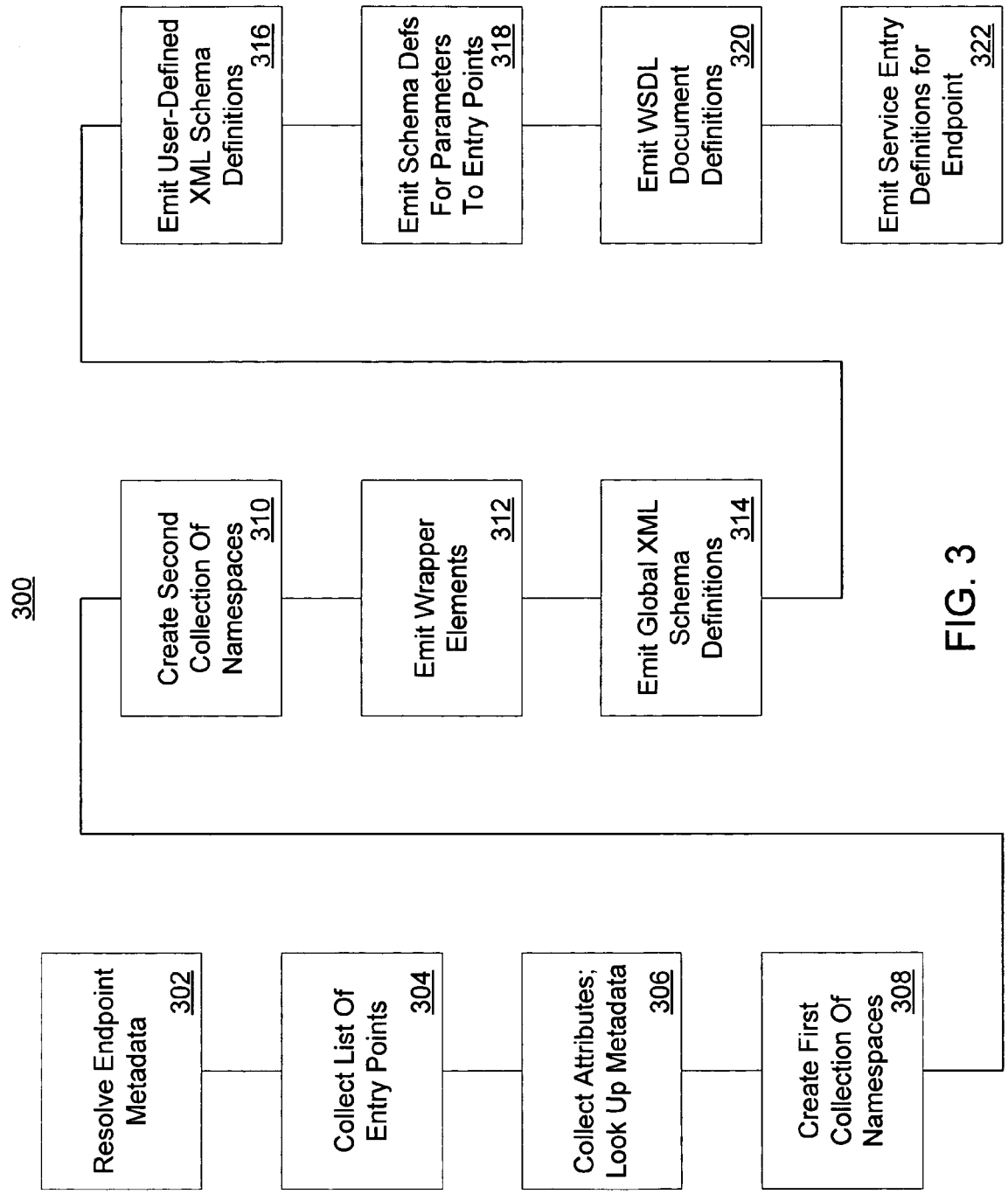
FIG. 3 is a flowchart of an example embodiment of a method according to the invention for dynamic generation of WSDL documents based on database metadata.

FIG. 3 is a flowchart of an example embodiment of a method 300 according to the invention for dynamic generation of WSDL documents based on database metadata. At step 302, the endpoint metadata is resolved by querying based on parameters about the request collected by the HTTP stack. The endpoint metadata is resolved to determine which configuration information matters for this particular request. There may be multiple pieces of configuration information and it may be necessary to determine which one(s) are necessary to fulfill a particular request. For example, it may be necessary to pick a certain piece (or certain pieces) that match the information being requested.

At step 304, the list of entry points that have been mapped (i.e., configured) is collected from the endpoint metadata. Such entry points may include functions or stored procedures, for example, that may be called as part of the service.

At step 306, for each entry point, attributes about the entry point are collected. Such attributes may include, for example, the name of the end point, a URL, etc. Metadata for the types of parameters to the entry point is looked up.

At step 308, a first collection of unique XML Schema namespaces is created. The first collection includes one entry corresponding to each unique XML Schema namespace for any arbitrary user-defined XML Schema definitions required by a parameter to an entry point. An entry point may have a name. Zero or more parameters may be associated with an entry point. Each parameter may have a name and a type. To call the entry point, one needs to know the entry point name, and the parameters' names and types.

For example, consider an entry point named "put_document." A list of parameters, p1, p2, may be required to call the entry point. Accordingly, the entry point may be called as put_document (p1, p2). p1 is parameter name, and might be of type nvarchar(256), for example, which may be a standard XML type. p2 is a parameter name, and might be of type "patentdocument," which may be a user-defined type. For example, a user may define a type "patentdocument" by providing an XML schema for type "patentdocument." According to an aspect of the invention, if a number of entry points exist, and they refer to a number of user-defined types, then the user-defined types may be collected and grouped by namespace because, preferably, they are to be emitted by namespace during the generation of the WSDL document. This is a requirement of the semantics of XML Schemas, such that all definitions for types within a particular XML namespace must be collected within a single XML Schema definition for that XML namespace. In addition, if several entry points all refer to the same user-defined type, that user-defined type may, preferably, only be emitted once in the WSDL document.

At step 310, a second collection of unique XML Schema namespaces is created, with one entry corresponding to each unique XML Schema namespace for an entry point. Again, those skilled in the art will recognize that the names of the entry points might have user-defined XML namespaces, and it will be necessary to group all entry points which are in the same XML namespace into the same XML Schema definition for that namespace.

At step 312, the wrapper elements for the WSDL document are emitted. A standard WSDL document has particular, well-defined format. For example, a standard WSDL document includes a preamble that indicates that the document is a WSDL document. Wrapper elements, for example, are standard-defined generic formats for WSDL documents. It should be understood that the preamble and wrapper elements may be emitted at any time during generation of the WSDL document.

At step 314, any global XML schema definitions are emitted. In certain environments, there may be some data structures, such as SOAP headers, for example, that are commonly used. Such data structures might be used anywhere in any request that might be sent back and forth, and they are typically independent of any particular request because they might be applied in any request. It should be understood that global XML schema definitions may be emitted at any time during generation of the WSDL document, as long as they are placed within the XML schemas section of the WSDL document.

At step 316, the first collection of unique XML schema namespaces are iterated through, and the XML schema definitions emitted. For example, if a first type, e.g., patentdocument, is based on a second type, e.g., generaldocument, then the WSDL document should define type generaldocument before it introduces type patentdocument. Consequently, a definition for put_document may be emitted first. It should be understood that the XML schemas in the first collection of unique XML schema namespaces might be emitted at any time during the generation of the WSDL document, so long as they are placed within the XML schemas section of the WSDL document.

It should be understood that a user can choose fairly arbitrary names. Names have two parts: an XML namespace part and a name part. A name may be represented as namespace:name, where "namespace" is the XML namespace part and "name" is the name part. If the user arbitrarily picks the same XML namespace for two types, say, NS1:A, NS1:B, then the namespaces should be grouped accordingly in the WSDL document. For example, namespace NS1 may be emitted, followed by the types for NS1. After all the types for NS1 have been emitted, then the next namespace, say, NS2, may be emitted, followed by the types for NS2. All unique namespaces may be identified, and all names may be iterated through to find all names that correspond to each namespace.

At step 318, the second collection of unique XML Schema namespaces are iterated through. For each entry point in the collection, the XML Schema definition for the entry point may be emitted, including any XML Schema definitions for parameters to the entry point. It should be understood that the XML schemas in the second collection of unique XML schema namespaces might be emitted at any time during the generation of the WSDL document, so long as they are placed within the XML schemas section of the WSDL document.

At step 320, after emitting all of the XML Schema definitions, the entry points may be iterated through. For each entry point, WSDL document definitions are emitted for messages, port types, and bindings (which are defined in the WSDL standard and provide everything necessary to define a callable entry point).

After all of the message definitions are emitted, the WSDL document may be completed, at step 322, by emitting service entry definitions for the endpoint. Such service information may include a name of the service, the URL it is at, etc. A service may have multiple entry points.

FIG. 4 is a block diagram representing an example workspace 400 for collecting information from which to build a WSDL document. As described above in connection with step 306, entry point attributes 402 may be collected. Such attributes may include, for example, the name of the end point, a URL, etc. Entry points 404 may be collected in the workspace. Each entry point may have an associated name, zero or more parameters, and zero or more parameter types. Unique XML types 406 may also be collected in the workspace. By collecting such data in a workspace, the system can efficiently collect data from the database metadata, and yet control the order in which certain definitions are emitted to generate the WSDL document.

FIG. 5 depicts an example WSDL document 500 generated using a method according to the invention. Such a document may include a WSDL wrapper 502, type information 504, a collection of entry points 506, and service information 508 as described in detail above.

It should be understood that information may be grouped in the WSDL document differently from how it is grouped in the database. For example, two services might use the same type, and it may be undesirable to emit the same type twice. Also, because the database might have multiple copies of type information, the data should be inspected in order for a determination to be made that the same type occurs more than once.

Typically, the first things that can be resolved are the last things to be written to the WSDL document. Similarly, the last things that can be resolved are the first things to be written. For example, in WSDL there is a particular order in which one may have to emit all the declarations. In order to use a certain type, that type may have to be defined in the document before it is used. Consequently, according to an aspect of the invention, a workspace may be built and collections created, before the data is emitted in the proper order. For example, database queries may be run, data may be pulled out of the queries and collected in certain ways that enable the document to be generated in order.

By emitting data to generate the WSDL document in the order described herein, the document can be generated from top to bottom. Consequently, the document may be emitted piecemeal over a network, if desired, so there is no need to save the whole document in memory and then send over the network. Alternatively, the document may be stored and then sent over the network as a whole.

Thus, there have been described methods for dynamic generation of WSDL documents, based on database metadata, that can be used in a programming environment. Any application that wants to invoke entry points on the service can use the document to support the programming environment for writing applications and can use the document as part of generating and processing SOAP messages. Thus, a WSDL document may be defined that such an application can use the WSDL document to invoke entry points within the database. Typically, though not necessarily, such entry points will be programs written by a database administrator.

Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A computer implemented method for dynamic generation of WSDL documents based on database metadata, the method comprising:

resolving database endpoint metadata by querying based on parameters about a request;

collecting, from the database endpoint metadata, a list of entry points into the database that have been mapped;

creating a first collection of unique XML schema namespaces, with one entry corresponding to each unique XML schema namespace for any arbitrary user-defined XML schema definitions required by a parameter to a database entry point;

creating a second collection of unique XML schema namespaces, with one entry corresponding to each unique XML schema namespace for a database entry point;

emitting wrapper elements for a WSDL document;

emitting arbitrary user-defined XML Schema definitions required by parameters to the database entry points, wherein all duplicated user-defined types in a single XML schema namespace are represented by a single user-defined type;

emitting, for each database entry point in the collection, the XML schema definition for the entry point;

emitting WSDL document definitions for messages, port types, and bindings for each entry point; and emitting service entry definitions for the endpoint; wherein the completion of all emitting activities generates a WSDL document for said database entry points.

2. The method of claim 1, wherein the request is collected by an HTTP stack.

3. The method of claim 1, further comprising:

iterating through the collection of unique XML schema namespaces for XML schema namespaces for entry points;

wherein the XML schema definitions include XML schema definitions for parameters to the entry point.

4. The method of claim 1, wherein the WSDL document definitions are emitted after all of the XML schema definitions are emitted.

5. The method of claim 1, further comprising:

iterating through the entry points to identify the WSDL document definitions for messages, port types, and/or bindings for each entry point.

6. The method of claim 1, wherein the service entry definitions are emitted after all of the message definitions are emitted.

7. The method of claim 1, further comprising:

emitting a global XML schema definition.

8. The method of claim 1, further comprising:

iterating through the collection of unique XML schema namespaces for the arbitrary user-defined XML schema definitions required by parameters to entry points.

9. The method of claim 1, further comprising:

collecting respective attributes about each entry point, and retrieving metadata for the types of parameters to the entry point.

10. A computer implemented method for dynamically generating a WSDL document, the method comprising:

creating a first collection of unique XML schema namespaces, with one entry corresponding to each unique XML schema namespace for any arbitrary user-defined XML schema definitions required by a parameter to a database entry point;

creating a second collection of unique XML schema namespaces, with one entry corresponding to each unique XML schema namespace for a database entry point;

emitting wrapper elements for a WSDL document;

iterating through the first collection of unique XML schema namespaces for XML schema namespaces for entry points, emitting an XML schema namespace for each non-duplicated entry point;

iterating through the second collection of unique XML schema namespaces for the arbitrary user-defined XML schema definitions required by parameters to entry points, emitting an XML schema definition for each non-duplicated user-defined XML schema namespace; and generating a WSDL document including XML schema definitions associated with the XML schema namespaces for entry points and the arbitrary user-defined XML schema definitions.

11. The method of claim 10, further comprising:

iterating through the entry points to identify WSDL document definitions for messages, port types, and bindings for each entry point.

12. The method of claim 11, further comprising emitting the WSDL document definitions after all of the XML schema definitions have been emitted.

13. The method of claim 10, further comprising:

receiving a request for the WSDL document; and generating the WSDL document in response to receiving the request.

14. The method of claim 13, wherein creating each of the first collection of unique XML schema namespaces and the second collection of unique XML schema namespaces comprises querying a database for metadata.

* * * * *